US012681207B2

(12) United States Patent
Hoyal et al.

(10) Patent No.: US 12,681,207 B2
(45) Date of Patent: Jul. 14, 2026

(54) METHODS AND SYSTEMS FOR CONSTRAINING SUBSURFACE MODELS

(71) Applicant: ExxonMobil Technology and Engineering Company, Spring, TX (US)

(72) Inventors: David C. Hoyal, Houston, TX (US); Juan J. Fedele, Spring, TX (US); Kathryn C. Denommee, Houston, TX (US); Mrugesh S. Shringarpure, Cypress, TX (US); Nathan A. Lentsch, Cypress, TX (US); Nicole J. Bayliss, Spring, TX (US); Timothy Demko, Goodyear, AZ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 476 days.

(21) Appl. No.: 18/301,523

(22) Filed: Apr. 17, 2023

(65) Prior Publication Data

US 2023/0375744 A1 Nov. 23, 2023

Related U.S. Application Data

(60) Provisional application No. 63/342,866, filed on May 17, 2022.

(51) Int. Cl.
*G01V 20/00* (2024.01)

(52) U.S. Cl.
CPC .................................... *G01V 20/00* (2024.01)

(58) Field of Classification Search
None
See application file for complete search history.

(56) References Cited

U.S. PATENT DOCUMENTS

| | | | |
|---|---|---|---|
| 2009/0192718 A1* | 7/2009 | Zhang ...................... | G01V 1/30 |
| | | | 702/14 |
| 2011/0232913 A1* | 9/2011 | Sun ......................... | G01V 11/00 |
| | | | 703/10 |
| 2012/0158378 A1* | 6/2012 | Enchery ................. | G01V 11/00 |
| | | | 703/2 |
| 2013/0132047 A1* | 5/2013 | Granjeon ............... | G01V 1/282 |
| | | | 703/2 |
| 2021/0341642 A1* | 11/2021 | Harris ..................... | G06F 30/20 |

OTHER PUBLICATIONS

Juan J. Fedele, et al., "Bedforms created by gravity flows", pp. 95-121 of David A. Budd et al., Autogenic Dynamics and Self-Organization in Sedimentary Systems, SEPM, Special Publication 106, p. 2016; https://doi.org/10.2110/Sepmsp.106.12.

* cited by examiner

*Primary Examiner* — Lina Cordero
(74) *Attorney, Agent, or Firm* — WOMBLE BOND DICKINSON (US) LLP; Kevin J. Davis

(57) ABSTRACT

The methods for constraining subsurface models may include: analyzing at least one strata within a stratigraphic structure of a formation to ascertain one or more physical properties for the at least one strata; correlating the one or more physical properties for the at least one strata to one or more formative hydraulic and sediment transport parameters for the at least one strata based on a correlation; and modeling the formation with a subsurface model constrained by the one or more formative hydraulic and sediment transport parameters for the at least one strata.

16 Claims, 7 Drawing Sheets

METHODS AND SYSTEMS FOR CONSTRAINING SUBSURFACE MODELS

CROSS-REFERENCE TO RELATED APPLICATION

This application claims the benefit of U.S. Provisional Application Ser. No. 63/342,866, entitled "METHODS AND SYSTEMS FOR CONSTRAINING SUBSURFACE MODELS," May 17, 2022, the disclosure of which is hereby incorporated by reference in its entirety.

FIELD OF INVENTION

The present disclosure relates to methods and systems for constraining subsurface models.

BACKGROUND

In hydrocarbon exploration, development, and/or production stages, different types of data are acquired and utilized to create subsurface models. The subsurface models may be used to represent the subsurface structures (or formations), which may include a description of subsurface structures and material properties for a subsurface region. The measured or interpreted data for the subsurface region may be utilized to create the subsurface model and/or to refine the subsurface model. For example, a subsurface model may represent measured or interpreted data for the subsurface region, such as seismic data and well log data, and may have material properties, such as rock properties. As another example, a subsurface model may be used to simulate flow of fluids within the subsurface region. Hybrids of the foregoing may also be used as subsurface models.

SUMMARY OF INVENTION

The present disclosure relates to methods and systems for constraining subsurface models.

A first nonlimiting example method comprises: analyzing at least one strata within a stratigraphic structure of a formation to ascertain one or more physical properties for the at least one strata; correlating the one or more physical properties for the at least one strata to one or more formative hydraulic and sediment transport parameters for the at least one strata based on a correlation; and modeling the formation with a subsurface model constrained by the one or more formative hydraulic and sediment transport parameters for the at least one strata.

A second nonlimiting example method comprises: analyzing at least one strata within a stratigraphic structure of a formation to ascertain one or more physical properties for the at least one strata; and modeling the formation with a subsurface model, wherein the subsurface model comprises a correlation between the one or more physical properties for the at least one strata to one or more formative hydraulic and sediment transport parameters for the at least one strata, and wherein the subsurface model is constrained by the one or more formative hydraulic and sediment transport parameters for the at least one strata.

A nonlimiting example system comprises: a processor; a memory coupled to the processor; and instructions provided to the memory, wherein the instructions are executable by the processor to cause a system to perform either of the foregoing methods.

These and other features and attributes of the disclosed methods and systems of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

The present disclosure relates to methods and systems for constraining subsurface models. More specifically, the subsurface models and related methods and systems may be constrained by one or more formative hydraulic and sediment transport parameters. Formative hydraulic and sediment transport parameters describe the conditions present when particulate material was deposited. As layers and layers of particulate material build up, the lower layers are compressed and, eventually, a formation is formed.

As used herein, the term "stratigraphic structure" refers to the order and relative position of individual geographic strata or layers within a formation. The physical characteristics of each strata within the stratigraphic structure depends, at least in part, on the formative hydraulic and sediment transport parameters for that strata. For example, the size of the particulate material when deposited and the way in which the particulate material is deposited effects the fluid flow characteristics through the resultant strata.

Subsurface models of the present disclosure incorporate formative hydraulic and sediment transport parameters when modeling strata within a formation. Said model may be used to derive fluid flow characteristics through the formation using the model. In the present disclosure, the one or more formative hydraulic and sediment transport parameters for a strata may be ascertained by a correlation between said formative hydraulic and sediment transport parameters and a physical characteristics of the strata. The physical characteristics of a strata may be extracted from the rock record at different scales, for example, from bedforms (micro-scale) to depositional body characteristics (meso-scale) to fan geometry and basinal context (macro-scale).

Individual physical characteristics of a strata (e.g., a basin geometry, a channel-lobe organization, a channel pattern, an avulsion pattern, a bedform type, a bedform stacking, a bedform structural characteristic, and the like) may be ascertained, or otherwise derived, from the rock record (e.g., seismic data, seafloor images, core samples, well log data, and the like) at more than one scale. Characterization at different scales may reduce the uncertainty in the characterization values and, ultimately, improve the accuracy of the subsurface model.

Figure 1:
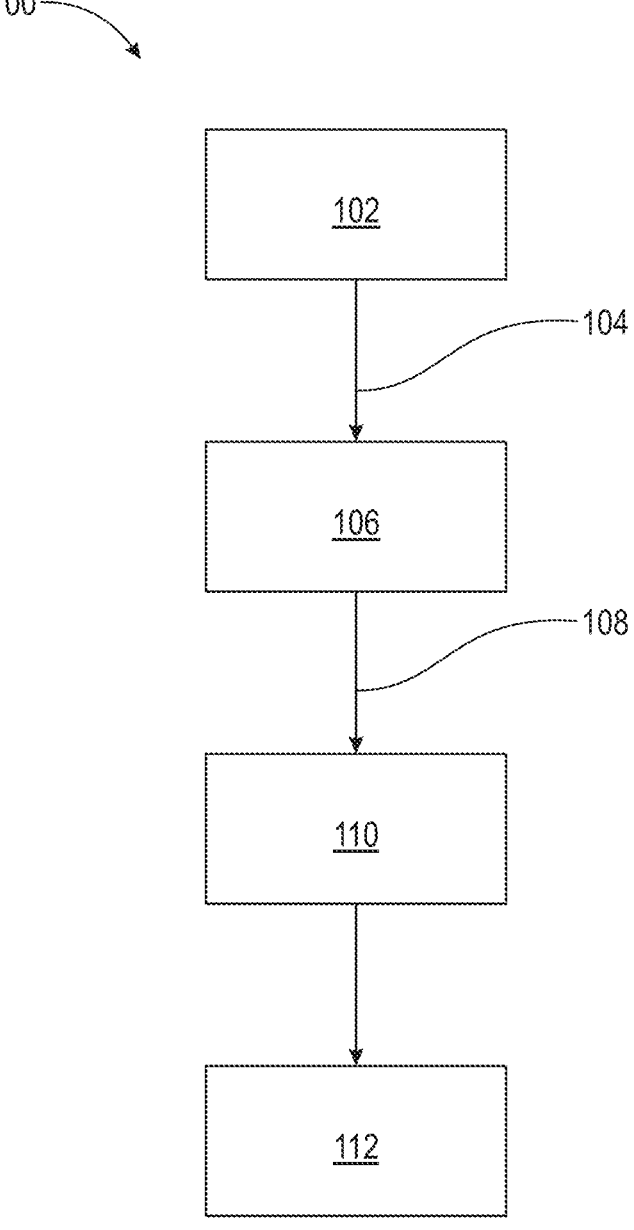
FIG. 1 is a flow diagram illustrating a nonlimiting example method of the present disclosure.

FIG. 1 is a flow diagram illustrating a nonlimiting example method 100 of the present disclosure. The illustrated method 100 includes analyzing 104 at least one strata 102 within a stratigraphic structure of a formation to ascertain one or more physical properties 106 for the at least one strata 102. The one or more physical properties 106 for the at least one strata 102 may then be correlated 108 (e.g., using a correlation, for example, a regime diagram) to one or more formative hydraulic and sediment transport parameters 110 for the at least one strata 102. The resultant one or more formative hydraulic and sediment transport parameters 110 for the at least one strata 102 may then be used as inputs for constraints within modeling the formation with a subsurface model 112.

Figure 2:
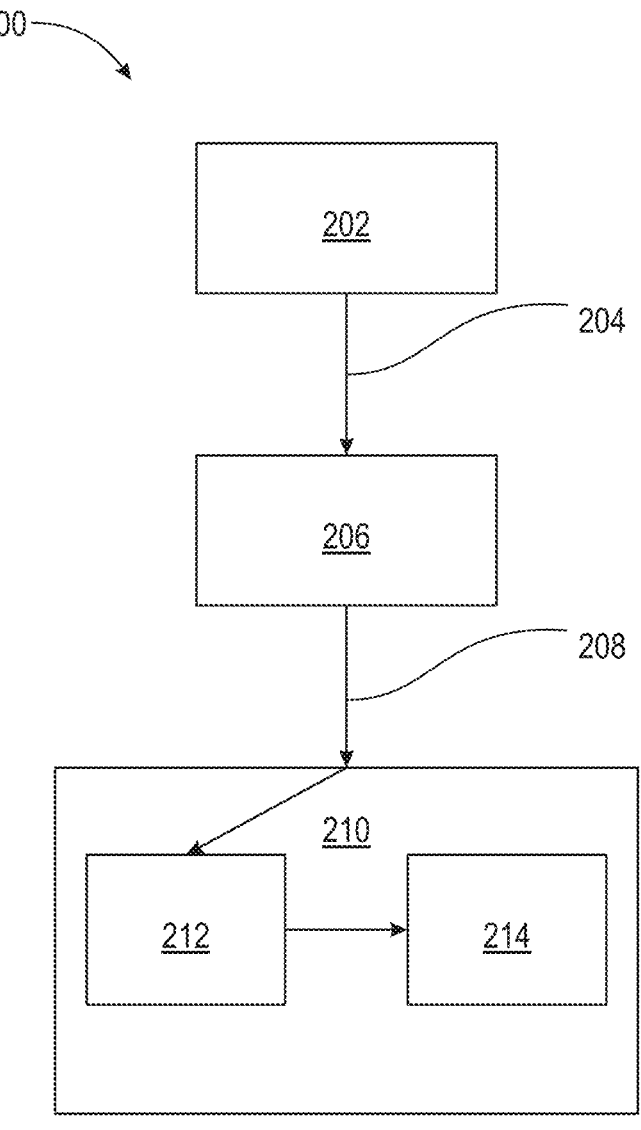
FIG. 2 is a flow diagram illustrating a nonlimiting example method of the present disclosure.

FIG. 2 is a flow diagram illustrating a nonlimiting example method 200 of the present disclosure. The illustrated method 200 includes analyzing 204 at least one strata 202 within a stratigraphic structure of a formation to ascertain one or more physical properties 206 for the at least one strata 202. The one or more physical properties 206 for the at least one strata 202 may then be used as inputs to a subsurface model 210 that comprise a correlation 212 (e.g., a regime diagram) between the one or more physical properties 206 for the at least one strata 202 to one or more formative hydraulic and sediment transport parameters 214 for the at least one strata 202. The resultant one or more formative hydraulic and sediment transport parameters 214 for the at least one strata 202 may then be used as constraints within the subsurface model 210.

Analysis of the strata may be based on, for example, well log data, core samples, seismic data, surface images, the like, and any combination thereof. Preferably, values for at least some of the physical properties of a strata are based on the analysis of one more than one of the foregoing.

Examples of types of well logs may include, but are not limited to, image logs, gamma ray logs, resistivity logs, density logs, porosity logs, acoustic logs, nuclear magnetic resonance logs, the like, and any combination thereof.

Strata form organized structures at different nested scales. Examples of physical properties of strata may include, but are not limited to, a basin geometry, a basin context, a channel-lobe organization, a channel pattern, an avulsion pattern, a bedform type, a bedform stacking, a bedform structural characteristic, bedform migration direction, the like, and any combination thereof. Bedforms are flow perpendicular deformations of a sand bed with specific geometric properties. Examples of bedform structural characteristics may include, but are not limited to, a wavelength, a wave height, a bedform slope, a bedform asymmetry, a planform crest shape, the like, and any combination thereof.

Generally, basins are large scale, long term, depressions in the earth's crust determined by tectonics that are ultimately filled with sediment. At the largest scales (and longest timescales) sediment deposits (strata) take the shape of a basin. At a smaller scale (and shorter timescales) strata shape is determined by intrinsic sedimentary processes, fans, channel, lobes, bedforms, and the like.

Characteristic basin geometries, deformation modes, and sediment fill patterns are associated with different tectonic modes. This is the basin context. That is, basin geographic location is not random, it is determined by the distribution of plate tectonic mechanism (e.g., plate tectonic cycle), like oceanic crust formation, oceanic crust cooling, and oceanic crust destruction (subduction) together with more complex mechanisms on continental crust.

Channels in the ocean or associated with rivers have a range of characteristic channel patterns, like sinuous (meandering), braided, straight, single-threaded, multithreaded, and the like. The same is true for channels on the ocean floor.

Regarding channel-lobe organization, many of the deposits containing oil and gas evolve within a larger scale context of radiating divergent (distributive) channel networks on submarine fans. These fans may be continental and/or ocean basin scale but may also form at much smaller scales if a more localized tectonic mechanism exits, for example, salt withdrawal mini-basins in the gulf of sea. Fans are made up of nested lobes and channels also organized into a distributive pattern (as opposed to a tributive pattern like an eroding river basin). Pattern may refer to planform or to the vertical sacking along a cross-section.

Avulsion (e.g., channel breaking) is the process that determines the structure of the radiating (distributive) channel network. Avulsion pattern refers to the arrangement of a series of avulsions in time and space. Stratigraphic position (layering sequence) may provide a relative timing.

Characteristic channel patterns and channel network patterns tend to be associated with different ranges of sea bed slope which are in turn associated with different basin types (tectonic mechanisms) and their spatial distribution.

Regarding bedform stacking, bedforms migrate upstream (retreat) or downstream (advance) or vertically aggrade depending on the specific characteristics of the flow and sediment (particulate). Along flow sections, these patterns are characteristic of different slopes or mechanisms (e.g., contourite or oceanic thermohaline current deposits). Also useful in diagnosing the process and boundary conditions is the relation of the bedform crest to the dominant down slope direction. Most bedforms are flow perpendicular, but there can also be flow parallel large scale sediment waves associated with different mechanisms other than 'classic' bedforms.

The physical structure of strata may be determined by a number direct and indirect measurement techniques from detailed and localized core and down hole analyses to more extensive and less finally resolved geophysical techniques like seismic. The ability to generalize and apply this data depends on our characterization of the stratigraphic system and benefits from a hierarchical physics-based strategy. Detailed data (e.g., fine or small scale samples) may be applied more widely if supported by interpretations of the more extensive data set and is supported by theory and/or concepts. Utilizing this data within the context of a genetic hydraulics based model with appropriate hierarchy concepts (e.g., process changes with scale) can greatly increase the value of information and the value added by collecting more samples. Characterization of the degree of extrapolation (uncertainty) of the model can be carried through to economic forecasting models.

For example, analysis of the strata may be based on, for example, well log data, core samples, seismic data, surface images, the like, and any combination thereof.

Figure 3:
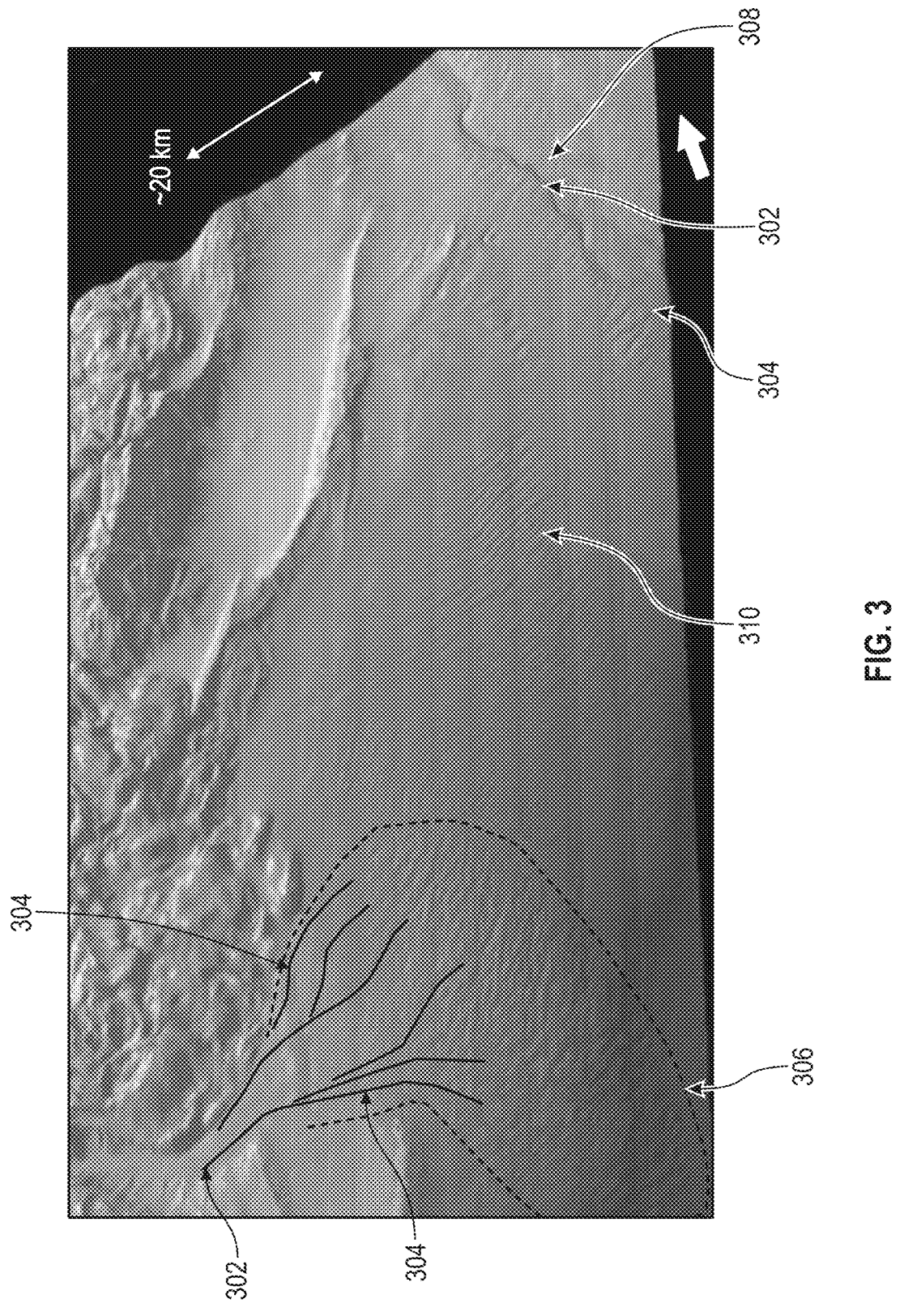
FIG. 3 illustrates a seabed with a variety of bedforms.

A bedform type may be described based on the surface shape, structure, confinement, geographic position within a larger scale structure like a channel or lobe, or inferred formation mechanism. FIG. 3 illustrates a seabed with a variety of bedforms (having a scale of approximately 20 kilometers (km)). Examples of bedform types include, but are not limited to, channel bedforms 302, lobe bedforms 304, fan bedforms 306, levee bedforms 308, contour current bedforms 310, and transitions from one shape to another. Without being limited by theory, the bedform types may be characterized and/or identified based on, for example, surface shape (or outline), particulate deposition structures, fluid flow confinement or its association with a channel or lobe.

Channels in deep water systems/fans associated with turbid currents have geometric channel patterns similar to rivers, but the interaction of ocean currents may lead to some significant modifications, which are not observed in rivers.

At the edges of channels fluid flows over-bank depositing typically finer-grained low amplitude channel-parallel depositional ridges that build up and further confine the fluid flow (levees).

Another characteristic surface shape (lobe) develops at the downstream termination of channels and levees due to a decrease in flow confinement and associated decrease in flow height. Lobes are characterized by a surface fan shape that typically widens downstream as the channel walls decrease in amplitude and flow expands and decelerates. Lobes are typically larger than channels and sandy. They frequently exhibit sediment waves (bedforms) near the top of the mound due to topographic interactions with turbid flows or bottom currents. The lobes and subsidiary sediment waves (bedforms) migrate upstream or downstream depending on the specific fluid flow conditions and sediment (particulate) size.

A larger scale complex of channels and lobes is called a fan. Superficially lobes and fans share a similar fan planform shape but fans are typically larger and more complex representing an amalgamation of many channels and lobes.

The other surface shape described herein is contour current which is a portion of the surface that has very little to no confinement (e.g., unconfined, which may be like a plain) and primarily bottom currents form waves of sediment along the surface whose crests are generally perpendicular to the fluid flow direction. Over time, more layers of particulate material may sediment on top of these bedforms and compress lower sediment layers.

Figure 4:
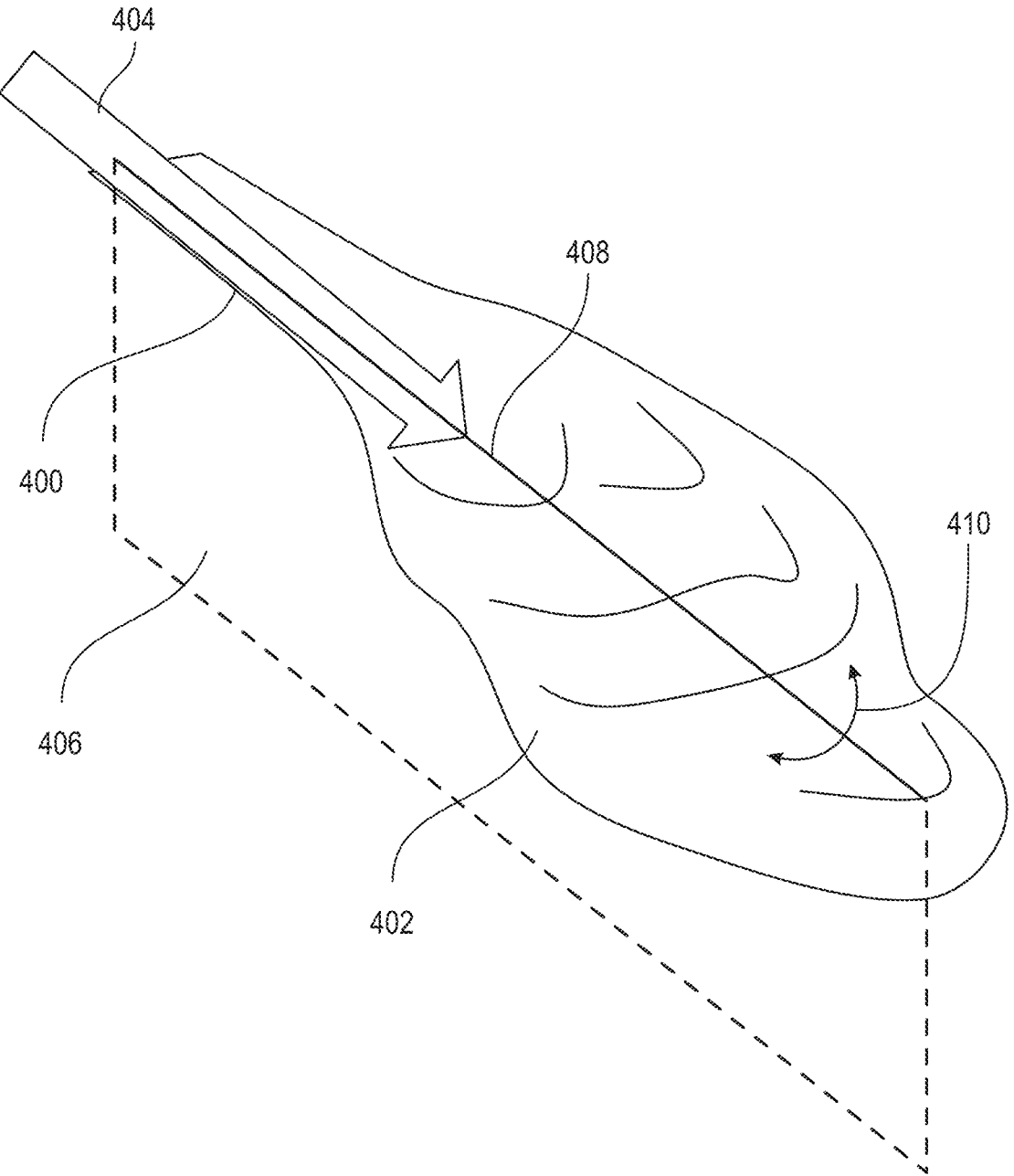
FIG. 4 illustrates a channel bedform transitioning into a lobe bedform along with a fluid flow direction relative to the two bedforms.

The methods described herein analyze the structural characteristics of a cross-section of seismic data in the fluid flow direction. FIG. 4 illustrates a channel bedform 400 transitioning into a lobe bedform 402 along with a fluid flow direction 404 relative to the two bedforms 400 and 402.

The seismic data analyzed in the methods and systems described herein is a cross-section 406 extending into the formation at least substantially in-line 408 with the fluid flow direction 404. The cross-section 406 may be along a line that is in-line with the fluid flow direction 404 plus or minus (+/−) 15° or in other examples, +/−10°.

Figure 5A:
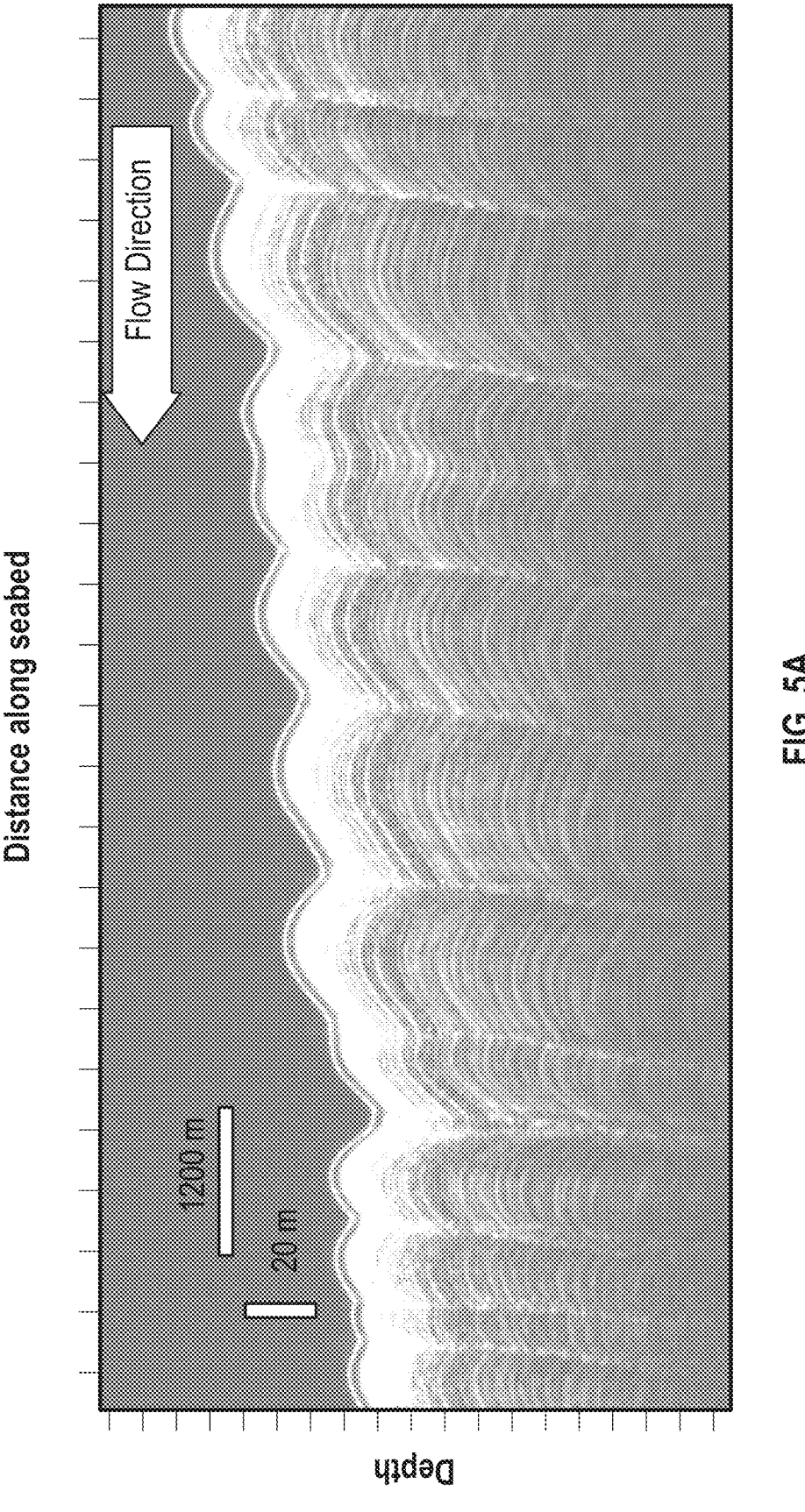
FIG. 5A illustrates a nonlimiting example of a seismic cross-section of a contour current bedform.

FIG. 5A illustrates a nonlimiting example of a seismic cross-section of a contour current bedform. The contour current bedform is shown based on the depth in 20 meter (m) increments as compared with distance along the seabed in 1200 m increments. Again, the seismic cross-section is at least substantially in-line with the fluid flow direction and perpendicular to the sediment wave (bedform) crests.

The structural characteristics of a cross-section of seismic data along the bedform in the fluid flow direction may include one or more of: a wavelength, a wave height, a bedform slope, a bedform asymmetry, a bedform migration, and a planform crest shape.

Figure 5B:
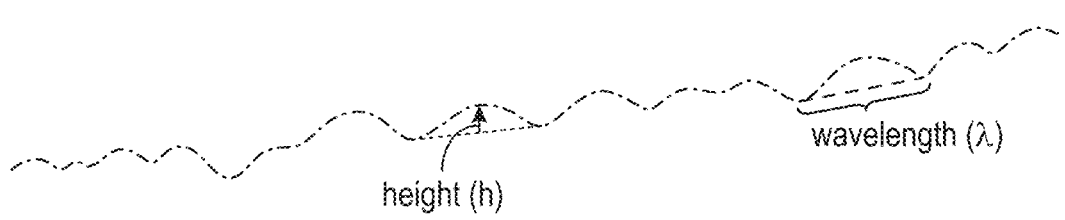
FIG. 5B is a trace-line for the surface of the cross-section of seismic data of FIG. 5A illustrating the wavelength and height measurements.

FIG. 5B is a trace-line for the surface of the cross-section of seismic data of FIG. 5A illustrating the wavelength and height measurements. The wavelength (λ) is the distance from valley-to-valley along the trace-line. The height (h) is the largest distance extending perpendicular for the valley-to-valley line defining wavelength to the trace-line. Image analysis software may be used to identify the line used to measure the wavelength and height. Multiple measurements in a single cross-section and over several cross-sections are preferably measured to determine a characteristic (e.g., a mean average, a mode average, a median average, or other suitable method) value for the wavelength and height.

Figure 5C:
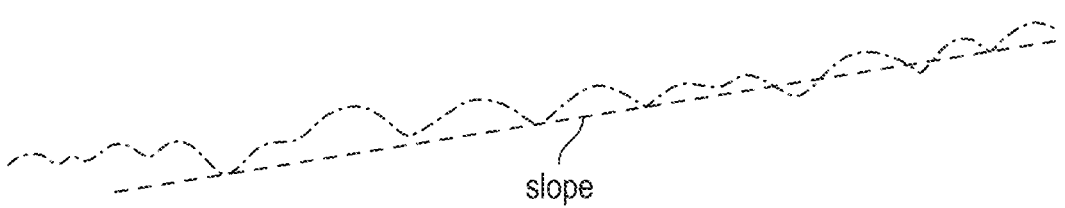
FIG. 5C is a trace-line for the surface of the cross-section of seismic data of FIG. 5A illustrating the bedform slope measurement.

FIG. 5C is a trace-line for the surface of the cross-section of seismic data of FIG. 5A illustrating the bedform slope measurement. To determine slope, a line is drawn to interest (or come close to) each of the valleys. Image analysis software may be used to identify the line used to measure the bedform slope. Several cross-sections are preferably measured to determine a characteristic (e.g., a mean average, a mode average, a median average, or other suitable method) value for the bedform slope. If possible, the slope line should be drawn approximately perpendicular to the bedform crests, if a method is available to identify the features in planform. Alternatively, the slope line (slope) may be corrected from a series of non-perpendicular sections.

Bedform asymmetry describes to the peak structures within along the trace-line. A symmetric structure has a peak near the center (e.g., within about the central 20%) between the two valleys. An asymmetric structure has a peak closer to one of the neighboring two valleys. An upslope asymmetry is the peak being closer to the upper of the two valleys. A downslope asymmetry is the peak being closer to the lower of the two valleys. In the FIG. 5A example, the bedform is asymmetric.

Bedform migration describes whether the direction of the slope relative to the fluid flow direction. In the FIG. 5A example, the bedform migration is upslope, but not to a large degree.

Planform crest shape describes the general shape of the trace-line from end-to-end, which spans hundreds of feet. Examples of planform crest shape include crescentic (a long mound), upslope concavity (a long valley), sinuous (wavy), and straight (little curvature). In the FIG. 5A example, the planform crest shape is sinuous.

For the bedform asymmetry, bedform migration, and planform crest shape several cross-sections are preferably analyzed to determine the proper characterization of the bedform. Image analysis software may be used to assist one or more of these analyses.

Over time, bedforms can be compressed as more particulate material is deposited thereon. Decompaction methods (e.g., equations) may be applied to the bedform structural characteristics. Of the bedform structural characteristics, the wave height may be the most effected by compression. The decompaction method or equation applied may depend on the rock type (e.g., sand vs. shale). In the example shown here, a porosity decompaction was used, from which a corrected vertical height of the bedform can be derived. There are other methods that may be used to obtain a corrected vertical length after decompaction. The purpose is to estimate a (decompacted) height of the bedform, which can then be used in the methods and systems presented herein.

The structural analysis of one or more strata may be performed to determine one or more physical properties for each of the one or more strata. The identity of the physical properties for each strata do not need to be the same. For example, a core sample may be available for a first strata but not a second strata. Accordingly, the method or systems may have characterized a physical property for the first strata that is not characterized in the second strata because of insufficient data for the second strata.

Image analysis and/or pattern recognition software may be used in ascertaining, or otherwise determining, the one or more physical properties for each of the one or more strata.

The one or more physical properties for each strata may then be correlated to one or more formative hydraulic and sediment transport parameters. The correlation may occur as part of a subsurface model, outside of a subsurface model, or some inside and some outside the subsurface model.

Examples of formative hydraulic and sediment transport parameters may include, but are not limited to, a fluid flow direction, a fluid source, a sediment concentration, a fluid flow velocity, Froude number, a Reynolds number, the like, and any combination thereof.

Correlations may be equations, graphs, or other suitable correlation representations. For example, the correlation may be, for example, a regime diagram.

Correlations between one or more physical properties of a strata and one or more formative hydraulic and sediment transport parameters may be determined empirically. For example, data from water tanks where particulate material, fluid flow, and slope may be controlled may be used to simulate the formation of bedforms and ascertain the structural characteristics of the bedform at formation. Said experiments are known as flume experiments. Further, in-field data (e.g., seafloor studies) where flow characteristics are known may also be used. Additionally, data may be simulated. Any combination of the foregoing may be used to ascertain a correlation. The examples provided herein include suitable correlations that may be used. Correlations may be refined over time as additional data is available.

Nonlimiting examples of correlations may include, but are not limited to, (a) a plot of Froude number as a function of Reynolds number with an overlay of bedform type zones, (b) a plot of bedform steepness as a function of bedform slope with an overlay of characteristic grain types zones, the like, and hybrids thereof.

These correlations may be used to ascertain the one or more formative hydraulic and sediment transport parameters based on the one or more physical properties. For example, where a bedform type is known for a strata, the Froude number and the Reynolds number may be constrained for said strata within the subsurface model according to the overlaid bedform type zone of the (a) example correlation above.

Methods of the present disclosure may include performing a wellbore operation that is, at least in part, informed or otherwise based on the subsurface model and properties of the formation determined by the subsurface model. Examples of such properties may include, but are not limited to, fluid flow through the formation, connectivity, porosity, permeability, the like, and any combination thereof.

Examples of wellbore operations may include, but are not limited to, drilling operations, stimulation operations (e.g., fracturing operations, acidizing operations, propping operations, flooding operations, and the like), production operations, and the like.

The methods described herein can, and in many embodiments must, be performed using computing devices or processor-based devices. "Computer-readable medium" or "non-transitory, computer-readable medium," as used herein, refers to any non-transitory storage and/or transmission medium that participates in providing instructions to a processor for execution. Such a medium may include, but is not limited to, non-volatile media and volatile media. Non-volatile media includes, for example, NVRAM, or magnetic or optical disks. Volatile media includes dynamic memory, such as main memory. Common forms of computer-readable media include, for example, a floppy disk, a flexible disk, a hard disk, an array of hard disks, a magnetic tape, or any other magnetic medium, magneto-optical medium, a CD-ROM, a holographic medium, any other optical medium, a RAM, a PROM, an EPROM, a FLASH-EPROM, a solid state medium like a memory card, any other memory chip or cartridge, or any other tangible medium from which a computer can read data or instructions. When the computer-readable media is configured as a database, it is to be understood that the database may be any type of database, such as relational, hierarchical, object-oriented, and/or the like. Accordingly, exemplary embodiments of the present systems and methods may be considered to include a tangible storage medium or tangible distribution medium and prior art-recognized equivalents and successor media, in which the software implementations embodying the present techniques are stored.

The methods described herein can, and in many embodiments must, be performed using computing devices or processor-based devices that include a processor; a memory coupled to the processor; and instructions provided to the memory, wherein the instructions are executable by the processor to perform the methods described herein (such computing or processor-based devices may be referred to generally by the shorthand "computer"). For example, a system may comprise: a processor; a memory coupled to the processor; and instructions provided to the memory, wherein the instructions are executable by the processor to cause a system to: analyze at least one strata within a stratigraphic structure of a formation to ascertain one or more physical properties for the at least one strata; correlate the one or more physical properties for the at least one strata to one or more formative hydraulic and sediment transport parameters for the at least one strata based on a correlation; and model the formation with a subsurface model constrained by the one or more formative hydraulic and sediment transport parameters for the at least one strata.

For example, a system may comprise: a processor; a memory coupled to the processor; and instructions provided to the memory, wherein the instructions are executable by the processor to cause a system to: analyze at least one strata within a stratigraphic structure of a formation to ascertain one or more physical properties for the at least one strata; and model the formation with a subsurface model, wherein the subsurface model comprises a correlation between the one or more physical properties for the at least one strata to one or more formative hydraulic and sediment transport parameters for the at least one strata, and wherein the subsurface model is constrained by the one or more formative hydraulic and sediment transport parameters for the at least one strata.

Similarly, any calculation, determination, or analysis recited as part of methods described herein may be carried out in whole or in part using a computer.

Furthermore, the instructions of such computing devices or processor-based devices can be a portion of code on a non-transitory computer readable medium. Any suitable processor-based device may be utilized for implementing all or a portion of embodiments of the present techniques, including without limitation personal computers, networks, laptop computers, computer workstations, mobile devices, multi-processor servers or workstations with (or without) shared memory, high performance computers, and the like.

Moreover, embodiments may be implemented on application specific integrated circuits (ASICs) or very large scale integrated (VLSI) circuits.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

ADDITIONAL EMBODIMENTS

Embodiment 1. A method comprising: analyzing at least one strata within a stratigraphic structure of a formation to ascertain one or more physical properties for the at least one strata; correlating the one or more physical properties for the at least one strata to one or more formative hydraulic and sediment transport parameters for the at least one strata based on a correlation; and modeling the formation with a subsurface model constrained by the one or more formative hydraulic and sediment transport parameters for the at least one strata.

Embodiment 2. The Embodiment of claim 1, wherein the correlation is a regime diagram.

Embodiment 3. The method of Embodiment 2 further comprising: performing flume experiments; and deriving the regime diagram based on data from the flume experiments.

Embodiment 4. The method of any of Embodiments 1 to 3, wherein the one or more formative hydraulic and sediment transport parameters comprises one or more of: a fluid flow direction, a fluid source, a sediment concentration, a fluid flow velocity, a bedform slope, Froude number, or a Reynolds number.

Embodiment 5. The method of any of Embodiments 1 to 4, wherein the one or more physical properties comprises one or more of: a basin geometry, a basin context, a channel-lobe organization, a channel pattern, an avulsion pattern, a bedform type, a bedform stacking, a bedform structural characteristic, or bedform migration direction.

Embodiment 6. The method of Embodiment 5, wherein the bedform structural characteristic comprises one or more of: a wavelength, a wave height, a bedform slope, a bedform asymmetry, and a planform crest shape.

Embodiment 7. The method of any of Embodiments 1 to 6, wherein the analyzing of the at least one strata comprises analyzing one or more of: well log data from the formation, a core sample from the formation, or seismic data from the formation.

Embodiment 8. The method of any of Embodiments 1 to 7, wherein the subsurface model provides outputs related to one or more of: fluid flow through the formation, connectivity, porosity, or permeability.

Embodiment 9. The method of any of Embodiments 1 to 8 further comprising: performing a wellbore operation based on the subsurface model.

Embodiment 10. A system comprising: a processor; a memory coupled to the processor; and instructions provided to the memory, wherein the instructions are executable by the processor to cause a system to perform the method of any of Embodiments 1 to 9.

Embodiment 11. A method comprising: analyzing at least one strata within a stratigraphic structure of a formation to ascertain one or more physical properties for the at least one strata; and modeling the formation with a subsurface model, wherein the subsurface model comprises a correlation between the one or more physical properties for the at least one strata to one or more formative hydraulic and sediment transport parameters for the at least one strata, and wherein the subsurface model is constrained by the one or more formative hydraulic and sediment transport parameters for the at least one strata.

Embodiment 12. The method of Embodiment 11, wherein the correlation is a regime diagram.

Embodiment 13. The method of Embodiment 12 further comprising: performing flume experiments; and deriving the regime diagram based on data from the flume experiments.

Embodiment 14. The method of any of Embodiments 11 to 13, wherein the one or more formative hydraulic and sediment transport parameters comprises one or more of: a fluid flow direction, a fluid source, a sediment concentration, a fluid flow velocity, a bedform slope, Froude number, or a Reynolds number.

Embodiment 15. The method of any of Embodiments 11 to 14, wherein the one or more physical properties comprises one or more of: a basin geometry, a basin context, a channel-lobe organization, a channel pattern, an avulsion pattern, a bedform type, a bedform stacking, a bedform structural characteristic, or bedform migration direction.

Embodiment 16. The method of Embodiment 15, wherein the bedform structural characteristic comprises one or more of: a wavelength, a wave height, a bedform slope, a bedform asymmetry, and a planform crest shape.

Embodiment 17. The method of any of Embodiments 11 to 16, wherein the analyzing of the at least one strata comprises analyzing one or more of: well log data from the formation, a core sample from the formation, or seismic data from the formation.

Embodiment 18. The method of any of Embodiments 11 to 17, wherein the subsurface model provides outputs related to one or more of: fluid flow through the formation, connectivity, porosity, or permeability.

Embodiment 19. The method of any of Embodiments 11 to 18 further comprising: performing a wellbore operation based on the subsurface model.

Embodiment 20. A system comprising: a processor; a memory coupled to the processor; and instructions provided to the memory, wherein the instructions are executable by the processor to cause a system to perform the method of any of Embodiments 11 to 19.

To facilitate a better understanding of the embodiments of the present invention, the following examples of preferred or representative embodiments are given. In no way should the following examples be read to limit, or to define, the scope of the invention.

EXAMPLES

Figure 6:
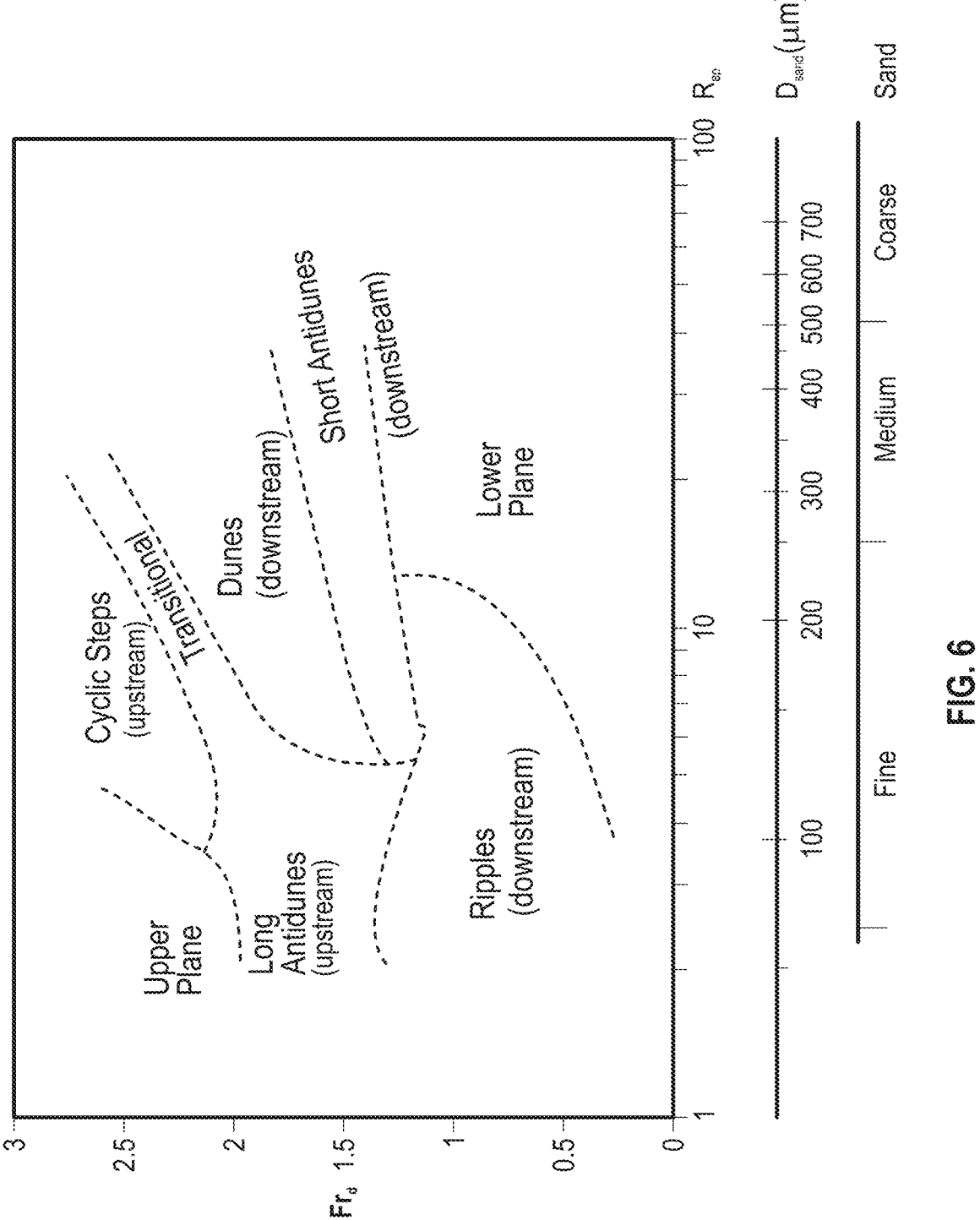
FIG. 6 is a nonlimiting example of a regime diagram.

A plurality of flume experiments were conducted where the Froude number, Reynolds number, and particulate matter size were varied. FIG. 6 is a nonlimiting example of a regime diagram derived from flume experiments that is a plot of Froude number as a function of Reynolds number (and of particulate matter size) with an overlay of the surface structures formed, which may be further broken down into individual physical properties like bedform structural characteristics (e.g., a wavelength, a wave height, a bedform slope, a bedform asymmetry, a planform crest shape, or any combination thereof). In FIG. 6, the plot is shown comparing the Froude number ($Fr_d$) compared with the Reynolds number ($R_{ep}$), which is also shown based on the particulate matter size ($D_{sand}$) in micrometers ($\mu m$) and sand type (Sand) (e.g., Fine, Medium and Coarse). As an example, the flow regime may include various bedforms (stratigraphic features, such as upper plane, cyclic steps (upstream), transitional, long antidunes (upstream), dunes (downstream), short antidunes (downstream), lower plane, and ripples (downstream). These variables are scale independent and the relationships (e.g., the correlations) may be applicable over large scale ranges. A subsurface model may include constraints for the Froude number and Reynolds number based on the FIG. 6 regime diagram or other diagrams and correlations derived from the flume experiments. Preferably, the regime diagram includes different stratigraphic features based on the flume experiments, field based experiments, theoretical, or any combination thereof. As may be appreciated by those skilled in the art, the regime diagram may be created as shown in Fedele et al. reference. See, e.g., Fedele, J., Hoyal, D., Barnaal, Z., Tulenko, J., Awalt, S., 2016, "Bedforms created by gravity flows", in a book by Budd, D., Hajek, E., Purkis, S. (Eds.), Autogenic Dynamics and Self-Organization in Sedimentary Systems, SEPM, Special Publication 106, p. 2016; https://doi.org/10.2110/sep-msp.106.12.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   analyzing at least one strata within a stratigraphic structure of a formation to ascertain one or more physical properties at a plurality of different scales for the at least one strata;
   correlating the one or more physical properties at the plurality of different scales for the at least one strata to one or more formative hydraulic and sediment transport parameters for the at least one strata based on a correlation, wherein the correlation is a regime diagram;
   modeling the formation with a subsurface model constrained by the correlated one or more formative hydraulic and sediment transport parameters for the at least one strata; and
   performing a wellbore operation based on the subsurface model.

2. The method of claim 1 further comprising:
   performing flume experiments; and
   deriving the regime diagram based on data from the flume experiments.

3. The method of claim 1, wherein the one or more formative hydraulic and sediment transport parameters comprises one or more of: a fluid flow direction, a fluid source, a sediment concentration, a fluid flow velocity, a bedform slope, a Froude number, or a Reynolds number.

4. The method of claim 1, wherein the one or more physical properties comprises one or more of: a basin geometry, a basin context, a channel-lobe organization, a channel pattern, an avulsion pattern, a bedform type, a bedform stacking, a bedform structural characteristic, or a bedform migration direction.

5. The method of claim 4, wherein the bedform structural characteristic comprises one or more of: a wavelength, a wave height, a bedform slope, a bedform asymmetry, and a planform crest shape.

6. The method of claim 1, wherein the analyzing of the at least one strata comprises analyzing one or more of: well log data from the formation, a core sample from the formation, or seismic data from the formation.

7. The method of claim 1, wherein the subsurface model provides outputs related to one or more of: fluid flow through the formation, connectivity, porosity, or permeability.

8. A system comprising:
   a processor;
   a memory coupled to the processor; and
   instructions provided to the memory, wherein the instructions are executable by the processor to cause the system to:

analyze at least one strata within a stratigraphic structure of a formation to ascertain one or more physical properties at a plurality of different scales for the at least one strata;

correlate the one or more physical properties at the plurality of different scales for the at least one strata to one or more formative hydraulic and sediment transport parameters for the at least one strata based on a correlation, wherein the correlation is a regime diagram; and model the formation with a subsurface model constrained by the one or more formative hydraulic and sediment transport parameters for the at least one strata, wherein the subsurface model is used to perform a wellbore operation.

9. A method comprising:

analyzing at least one strata within a stratigraphic structure of a formation to ascertain one or more physical properties at a plurality of different scales for the at least one strata; and modeling the formation with a subsurface model, wherein the subsurface model comprises a correlation between the one or more physical properties at the plurality of different scales for the at least one strata to one or more formative hydraulic and sediment transport parameters for the at least one strata, wherein the correlation is a regime diagram, and wherein the subsurface model is constrained by the one or more formative hydraulic and sediment transport parameters for the at least one strata; and performing a wellbore operation based on the subsurface model.

10. The method of claim 9 further comprising:

performing flume experiments; and deriving the regime diagram based on data from the flume experiments.

11. The method of claim 9, wherein the one or more formative hydraulic and sediment transport parameters comprises one or more of: a fluid flow direction, a fluid source, a sediment concentration, a fluid flow velocity, a bedform slope, a Froude number, or a Reynolds number.

12. The method of claim 9, wherein the one or more physical properties comprises one or more of: a basin geometry, a basin context, a channel-lobe organization, a channel pattern, an avulsion pattern, a bedform type, a bedform stacking, a bedform structural characteristic, or a bedform migration direction.

13. The method of claim 12, wherein the bedform structural characteristic comprises one or more of: a wavelength, a wave height, a bedform slope, a bedform asymmetry, and a planform crest shape.

14. The method of claim 9, wherein the analyzing of the at least one strata comprises analyzing one or more of: well log data from the formation, a core sample from the formation, or seismic data from the formation.

15. The method of claim 9, wherein the subsurface model provides outputs related to one or more of: fluid flow through the formation, connectivity, porosity, or permeability.

16. A system comprising:

a processor;

a memory coupled to the processor; and instructions provided to the memory, wherein the instructions are executable by the processor to cause the system to:

analyze at least one strata within a stratigraphic structure of a formation to ascertain one or more physical properties at a plurality of different scales for the at least one strata; and model the formation with a subsurface model, wherein the subsurface model comprises a correlation between the one or more physical properties at the plurality of different scales for the at least one strata to one or more formative hydraulic and sediment transport parameters for the at least one strata, wherein the correlation is a regime diagram, and wherein the subsurface model is constrained by the one or more formative hydraulic and sediment transport parameters for the at least one strata, wherein the subsurface model is used to perform a wellbore operation.

* * * * *